Aug. 29, 1939.  E. HAWKINS  2,171,089
VEHICLE LIGHTING UNIT
Filed Aug. 9, 1938
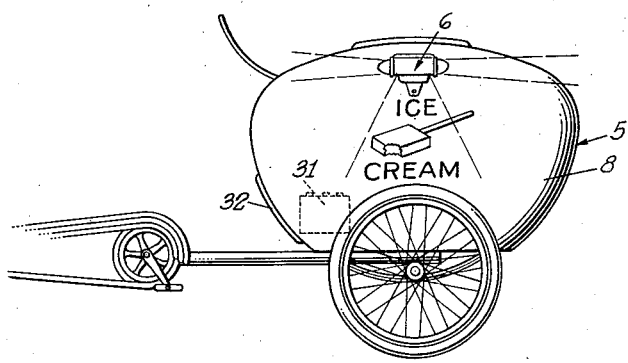
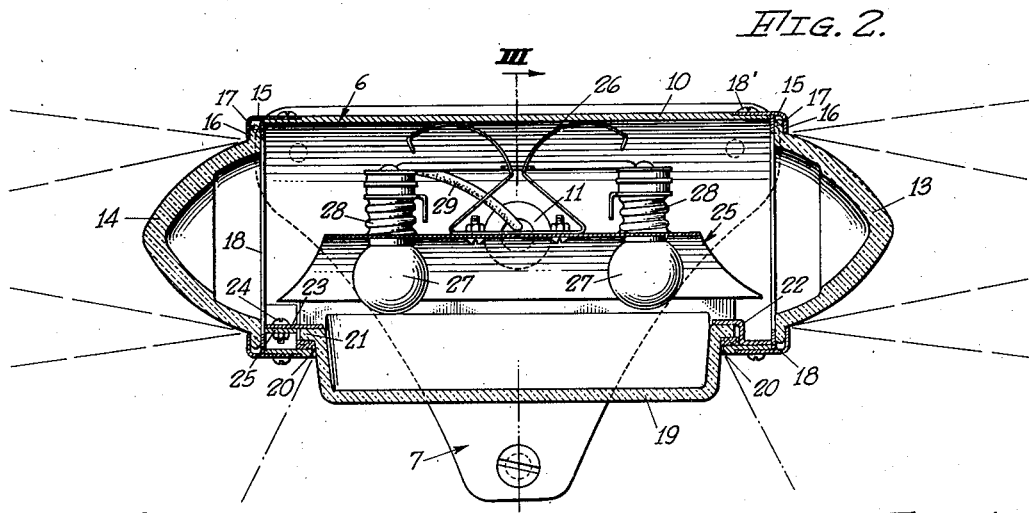
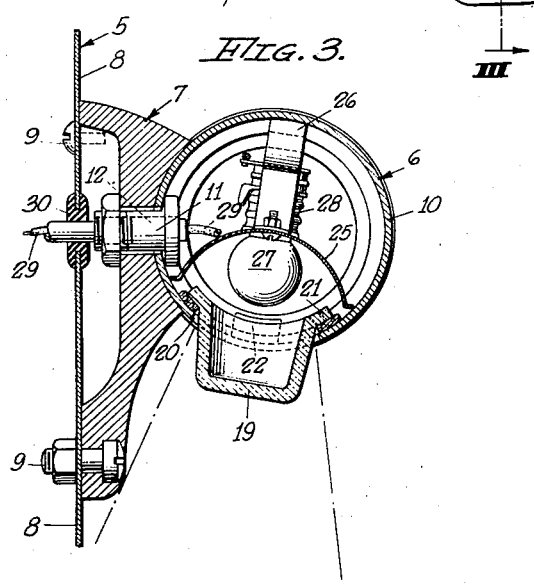
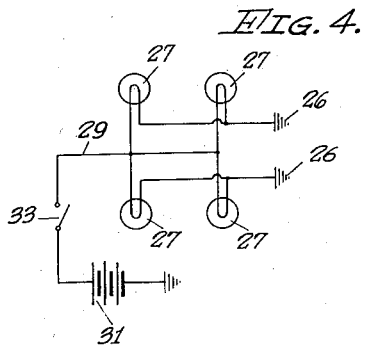
INVENTOR.
ELZA HAWKINS,
BY
ATTORNEY.

Patented Aug. 29, 1939

2,171,089

UNITED STATES PATENT OFFICE 2,171,089

VEHICLE LIGHTING UNIT

Elza Hawkins, Los Angeles, Calif., assignor to Good Humor Ice Cream Company of Los Angeles, Los Angeles, Calif., a corporation of California Application August 9, 1938, Serial No. 223,833

1 Claim. (Cl. 240—8.2)

My invention relates to a lighting unit and has particular reference to a combination forward, rear and flood lighting unit having particular utility when employed with vehicles bearing signs or other matters requiring artificial lighting.

As is well known, vehicles travelling the streets at night require forward and rear lights, and when such vehicles bear signs or advertising matter, it is the practice to supply additional flood lighting units for lighting these signs. If individual lighting units are used for these purposes, the first cost is relatively high and the most of maintenance is in proportion to the number of lighting units employed. Furthermore, the distribution of a considerable number of lighting units about the vehicle tends to detract from the pleasing appearance of the vehicle.

It is therefore a primary object of my invention to provide a combination lighting unit which will adequately serve three purposes; namely, act as a forward or head light, as a rear or tail light and as a flood light for signs or other matter requiring artificial illumination.

It is an additional object of my invention to improve the appearance of a vehicle of this class by employing a fewer number of lighting units for accomplishing the aforementioned object.

It is also an additional object of my invention to provide a novel reflecting unit for a combination light of this type to facilitate replacement of the lamps in the unit.

Other objects and advantages of my invention will be apparent from a study of the following specification, read in connection with the accompanying drawing, wherein Fig. 1 is an elevation showing the combination lighting unit of my invention installed on a vehicle for dispensing ice cream.

Fig. 2 is a longitudinal vertical section through the lighting unit showing the relation of the various parts.

Fig. 3 is a cross section taken on the line 3—3 of Fig. 2 to show additional details of construction.

Fig. 4 is a simplified wiring diagram which may be employed in the practice of my invention.

Referring to Fig. 1, I have illustrated my invention as applied as a lighting unit upon an ice cream dispensing vehicle 5, though it will be understood that the same may be applied to other forms of vehicles. I have illustrated combination lighting units 6, embodying my invention attached to each side of such vehicle. The lighting unit 6 includes a base 7 as shown in Figs. 2 and 3 constructed of metal or other suitable material and secured to the side 8 of the vehicle 5 as by bolts or screws 9. Attached to the base 7 is a tubular lamp housing 10 which may be secured to the base 7 in any suitable manner. However, I prefer to use a chase nipple 11 which serves the dual purpose of holding the lamp housing rigidly to the base and providing a wireway 12 for the installation of the necessary wiring for the lamps.

At each end of the housing I have provided light projectors, which include lenses or light directing elements, 13 and 14, the forward lens 13 preferably being clear or white, while the rear lens 14 is preferably constructed of ruby glass to provide a red rear light. The lenses 13 and 14 are secured to the housing 10 by means of retaining rings 15, which have an inward turned flange 16 for engaging a corresponding outward turned flange 17 on the lenses 13 and 14. The clamping ring 15 may be secured to the housing as by screws 18' or other suitable fastening means. In order to force the lenses 13 and 14 outwardly against the clamping rings 15, I provide a washer-like ring 18, the outer diameter of which corresponds to the inner diameter of the clamping ring 15, while the inner diameter of the washer-like ring 18 is smaller than the outer diameter of the lenses 13 and 14.

I have also provided a flood lighting projector which includes a lens 19 positioned in the lower part of the housing 10 in such location as to project light downwardly and toward the side 8 of the vehicle 5 so as to illuminate any signs or inscriptions on the side of the vehicle. The flood lighting lens 19 is arranged to project through an opening 20 in the housing 10 and is provided with outwardly turned flanges 21 adapted to engage the inner surface of the housing 10. I have provided clips 22 and 23 in the housing 10, arranged to extend over the flanges 21 of the flood lighting lens 19 to force the lens 19 outwardly against the housing 10. These clips may be secured to the housing in any suitable manner, but I prefer to permanently attach clip 22 to the housing 10 as by soldering, and make the clip 23 readily removable as by means of a screw 24 tapped into a member 25, which is in turn permanently secured to the housing 10.

In order to properly direct the light through the lenses 13, 14 and 19, I have provided a reflector 25 which is semi-cylindrical in shape, as best shown in Fig. 3. The reflector 25 is held in the proper position in the housing 10 by means of springs 26, which are attached to the back of the reflector 25 and arranged to bear upon the upper interior surface of the housing 10 and force the reflector downwardly against the lower part of the housing 10. As is shown in Fig. 2, the ends of the reflector 25 are cut back at an angle to allow light from a light source to pass through the lenses 13 and 14. As a light source, I prefer to employ well-known electric lamps 27 which are installed in the usual manner in suitable lamp sockets 28 attached to the back of the reflector 25.

The wires 29 for supplying the energy for the lamps may be brought in through a suitable insulating bushing 30, installed in the side 8 of vehicle 5, and extended into the lamp housing 10 through the wireway 12 of the chase nipple 11.

I prefer to use a battery 31 as a source of energy for the lamps 27, which battery may be mounted in a suitable compartment in the vehicle 5 and access thereto may be obtained through a removable hatch 32.

Referring to Fig. 4, it will be seen that I prefer to use a simple grounded circuit arrangement for energizing the lamps 27. I therefore ground one side of the battery 31 to the metal frame of the vehicle 5 and extend the other side through a switch 33, and thence to one terminal of the lamps 27. The other terminal of the lamp 27 then returns to ground from the socket housing 28 to the deflector 25, thence through the springs 26 to the grounded housing 10.

As has been previously stated, this type of construction facilitates removal and renewing of the lamps 27. This may be accomplished by removing either of the lenses 13 or 14 and sliding the reflector 25, together with the sockets 28 and lamps 27 attached thereto, out of the end of the housing 10. In this position the lamps may be readily removed and replaced and the reflector assembly reinserted in the housing 10.

It will therefore be seen that I have provided a combination lighting unit which will serve the triple purpose of providing a forward and a rear light for a vehicle, and a flood lighting unit for the illumination of signs or other matter on the side of the vehicle, and in which the source of illumination employed for the flood lighting also acts as a source of illumination for the forward and rear lighting purposes. This unit is so constructed as to improve, rather than to detract from, the appearance of a vehicle of this class, and is so constructed as to reduce to a minimum the cost of maintenance.

While I have shown and described the preferred embodiment of my invention, I do not desire to be limited to any of the details of construction shown or described herein, except as defined in the appended claim.

I claim:

In a lighting unit for vehicles, the combination of: a tubular housing; a pair of lenses each of which is identified with one end of said housing; means for attaching each of said lenses to said housing, said attaching means comprising a retaining ring encircling said lenses and attached to the end of said housing; a flood lighting lens having a flange projecting into the interior of said tubular housing; means for attaching said flood lighting means to said housing; a semi-cylindrical reflector within said housing with the open side of said reflector encompassing said flange on said flood lighting lens; and spring means attached to said reflector for removably restraining said reflector within said tubular housing.

ELZA HAWKINS.